United States Patent
Davidson

(10) Patent No.: US 9,426,628 B1
(45) Date of Patent: Aug. 23, 2016

(54) MULTI-LOCATION WIRELESS DEVICE TRACKING

(71) Applicant: Target Brands, Inc., Minneapolis, MN (US)

(72) Inventor: Christopher Michael Davidson, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 352 days.

(21) Appl. No.: 13/685,118

(22) Filed: Nov. 26, 2012

(51) Int. Cl.
*H04W 24/00* (2009.01)
*H04W 4/04* (2009.01)

(52) U.S. Cl.
CPC .......................... *H04W 4/04* (2013.01)

(58) Field of Classification Search
CPC ................................ H04W 4/02; H04W 64/00
USPC ........................ 455/456.1, 414.1; 340/539.13
See application file for complete search history.

(56) References Cited

U.S. PATENT DOCUMENTS

| | | | |
|---|---|---|---|
| 2002/0022483 A1 | 2/2002 | Thompson et al. | |
| 2004/0001469 A1 | 1/2004 | Ishidoshiro | |
| 2005/0068169 A1* | 3/2005 | Copley et al. | 340/539.13 |
| 2007/0279219 A1* | 12/2007 | Warriner | G07C 11/00 340/539.23 |
| 2010/0097214 A1 | 4/2010 | Sweeney et al. | |
| 2014/0066089 A1* | 3/2014 | Monks et al. | 455/456.1 |

OTHER PUBLICATIONS

Alert when MAC address connects to network, http://seclists.org/basics/2003/Oct/431, Oct. 15, 2012, 2 pgs.
Snort-Wireless User's Guide, Chapter 2—802.11 Detection Rules, http://www.snort-wireless.org/docs/usersguide/, Oct. 15, 2012, 12 pgs.

* cited by examiner

*Primary Examiner* — Chuck Huynh
(74) *Attorney, Agent, or Firm* — Theodore M. Magee; Westman, Champlin & Koehler, P.A.

(57) ABSTRACT

An identifier for a mobile device and information to include in an alert message are received. An alert rule is generated and stored in a plurality of alert filters, each alert filter is associated with a respective building, such that when a mobile device with the identifier attempts to connect to a network in any of a plurality of buildings, the alert message is issued with the information. Additionally, an address of a portable device is received in a search request. A database containing entries for a plurality of locations associated with a plurality of networks is searched to find locations where the portable device connected to a network. A list of locations and times where the portable device connected to a network is returned.

6 Claims, 14 Drawing Sheets

MULTI-LOCATION WIRELESS DEVICE TRACKING

BACKGROUND

Mobile devices such as phones, electronic books, tablet computers, netbooks and laptops contain wireless clients that allow the devices to detect and connect to open wireless networks through wireless routers. Typically, wireless routers have a limited range and as such cover a limited area. When a wireless device enters an area covered by a wireless router, it negotiates a connection with the wireless router by providing a media access control address (MAC address) which uniquely identifies the mobile device. Communications between the router and the mobile device utilize this MAC address after a connection is established.

The discussion above is merely provided for general background information and is not intended to be used as an aid in determining the scope of the claimed subject matter. The claimed subject matter is not limited to implementations that solve any or all disadvantages noted in the background.

SUMMARY

An identifier for a mobile device and information to include in an alert message are received. An alert rule is generated and stored in a plurality of alert filters, each alert filter is associated with a respective building, such that when a mobile device with the identifier attempts to connect to a network in any of a plurality of buildings, the alert message is issued with the information.

Additionally, an address of a portable device is received in a search request. A database containing entries for a plurality of locations associated with a plurality of networks is searched to find locations where the portable device has connected to a network. A list of locations and times where the portable device connected to a network is returned.

A system includes a point of sale register, a wireless router and a server. The wireless router connects to devices positioned at the point of sale register. The server receives data from the point of sale register and the wireless router and produces a cashier-device database entry comprising an identifier of a cashier operating the point of sale register and an identifier of a device connected to the wireless router during a transaction at the point of sale register.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Embodiments described below provide an alert system that notifies security personnel when a wireless device with a specific MAC address attempts to connect to a network. These alerts can be based on MAC addresses that were present during previous criminal activity, MAC addresses for devices that have been stolen, MAC addresses for devices known to be possessed by certain people and MAC addresses for devices that have a history with a cashier that indicates that the holder of the device disproportionally uses one cashier over all other cashiers. Alerts may further be based on a MAC address appearing in multiple locations in a same day or in multiple states in a same day.

Figure 1:
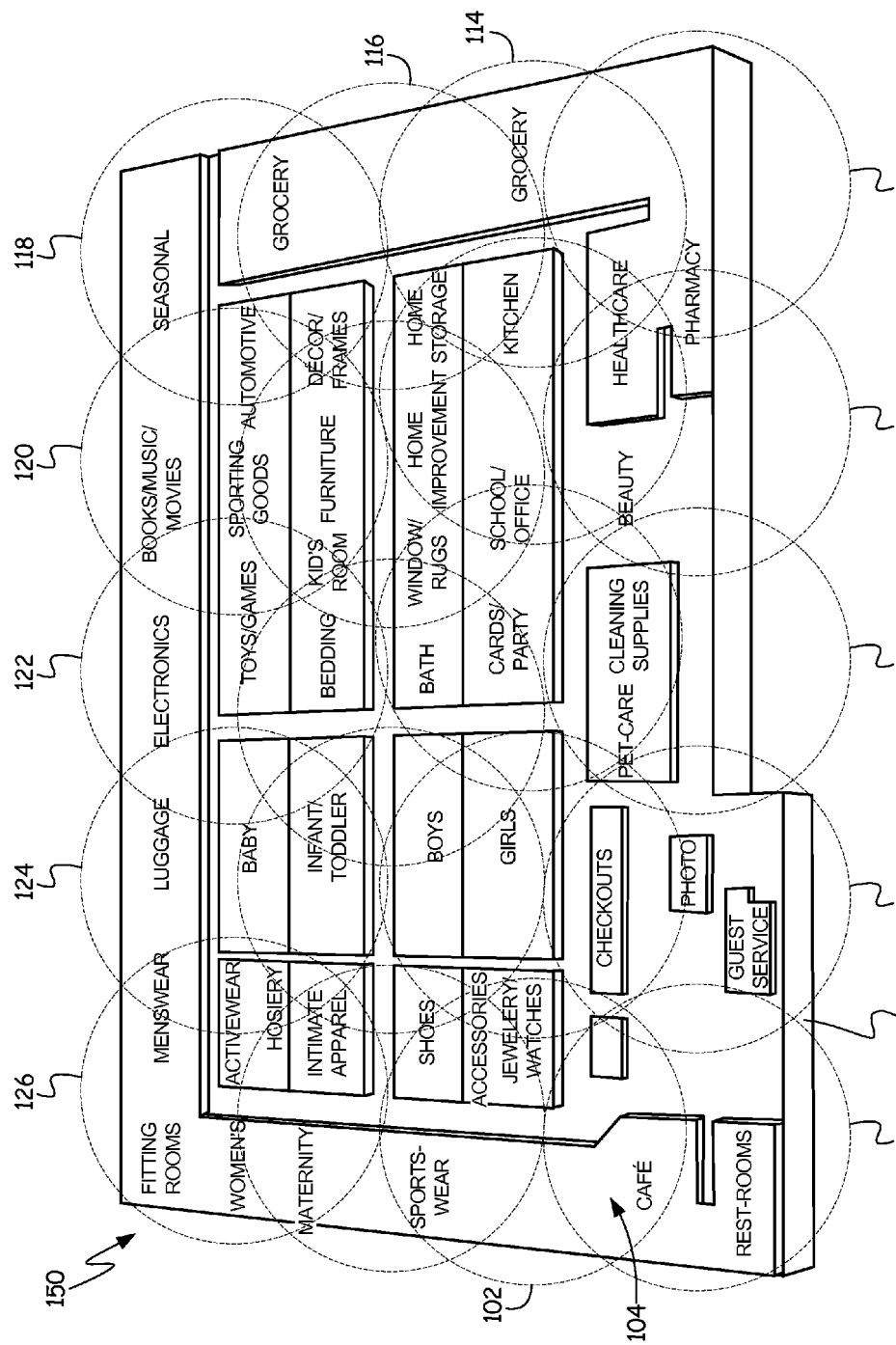
FIG. 1 provides a plan diagram showing a distribution of wireless hotspots across a retail store.

FIG. 1 provides a plan view of a retail store 150 showing an overlay of wireless hotspots. Each wireless hotspot represents an area supported by a wireless router in which a device may make a wireless connection to a network. As shown in FIG. 1, the wireless hotspots are shown as dotted circles such as hotspots 100 and 102. However, due to interference with structures, the wireless hotspots may be non-circular or there may be gaps in the coverage area of the wireless hotspot. As shown in FIG. 1, the wireless hotspots generally overlap with at least one other wireless hotspot. For example, wireless hotspots 100 and 102 overlap in a region 104. Some of the wireless hotspots such as wireless hotspots 100, 102, 106, 108, 110, 112, 114, 116, 118, 120, 122, 124 and 126 extend outside of the retail store 150.

Although the hotspots are shown as circular in FIG. 1, those skilled in the art will recognize that signal strength between a wireless router and a mobile device decreases as the mobile device moves away from the wireless router. As such, although two wireless hotspot areas may overlap, the efficiency of communicating with the routers associated with the overlapping hotspots will not be necessarily equal in the overlapping area but instead will be dependent on the distance between the wireless device and the wireless routers located at the center of the wireless hotspot.

Figure 2:
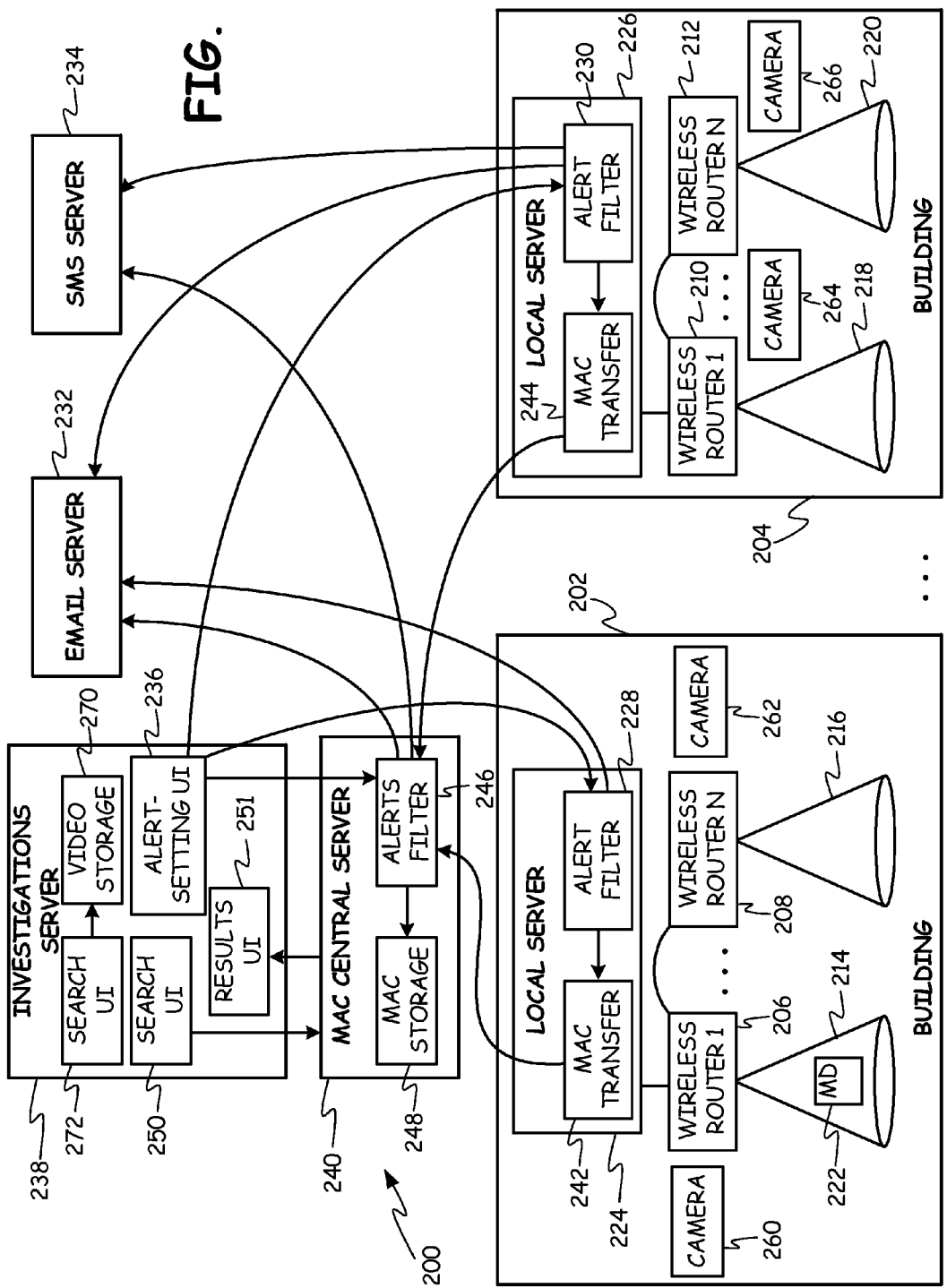
FIG. 2 provides a block diagram of a wireless alert system.

FIG. 2 provides a block diagram of elements used in a wireless device alert system. Wireless alert system 200 is operational across any number of buildings such as buildings 202 and 204. In each building, a collection of wireless routers are present such as wireless routers 206 and 208 in building 202 and wireless routers 210 and 212 in building 204, for example. Note that although only two routers are shown in each building, any number of desired routers may be provided. Each wireless router has a respective hotspot area 214, 216, 218 and 220 in which a mobile device (MD) 222 may connect to a network formed of the wireless routers and a local server such as local server 224 for building 202 and local server 226 for building 204. For example, in FIG. 2, portable or mobile device 222 is located in hotspot 214 of wireless router 206 such that mobile device 222 may connect through wireless router 206 to the network formed of wireless router 206, wireless router 208 and local server 224. Any one of wireless router 206, wireless router 208 and local server 224 may be connected to the Internet and provide a gateway to the Internet for mobile device 222. Similarly, any of wireless routers 210 and 212 and local server 226 may be connected to the Internet to provide a gateway for a mobile device connected through one of hotspots 218 and 220. Although the wireless routers and local server within each building are shown as a single network, those skilled in the art will recognize that the wireless routers may be divided into multiple networks each having a separate local server. In such embodiments, a separate Internet gateway is provided on each network. In FIG. 2, although only a single mobile device 222 is shown, those skilled in the art will recognize that each wireless router may support simultaneous connections to multiple mobile devices allowing multiple mobile devices to be connected to the network at the same time.

When a mobile device, such as mobile device 222, connects to a wireless router such as wireless router 206, the wireless router provides the MAC address of the mobile device and the connection time to the local server, such as local server 224. In some embodiments, the wireless router also indicates what time the mobile device disconnects from the network. The MAC address of the mobile device, the connection time and the MAC address of the wireless router that the mobile device is connected to are provided to an alert filter, such as alert filter 228, in local server 224 or alert filter 230 in local server 226. Alert filters 228 and 230 compare the MAC address of each mobile device as it connects to the network to a list of MAC addresses for which alerts have been created. If the MAC address of a mobile device connecting to the network matches an existing alert, the alert filter, such as alert filters 228, 230, executes the alert, which in some embodiments involves sending an e-mail through an e-mail server 232 or sending a message through a short message service (SMS) server 234. Examples of possible alerts are discussed further below. The alerts in the alert filters can be set by a user through an alert setting user interface 236 on an investigation server 238, as discussed further below.

After the MAC addresses have passed through an alert filter, they are transferred to a MAC central server 240 by a MAC transfer module, such as MAC transfer module 242 of local server 224 and MAC transfer module 244 of local server 226. The MAC addresses provided to the MAC central server 240 are passed through a further alerts filter 246, which includes alerts that are based on MAC addresses appearing in more than one building, as discussed further below. The alerts of alert filter 246 may be set using alert setting user interface 236 or a different alert setting user interface. If a MAC address triggers an alert in alerts filter 246, the alert may be sent out as an e-mail using e-mail server 232 and/or as a message using SMS server 234.

The MAC addresses provided to MAC central server 240 are stored in MAC storage 248 together with the wireless router's MAC address, the wireless router's name, a building identifier, the connection date/time and the disconnection date/time when the mobile device was connected to the wireless router. The MAC addresses stored in MAC storage 248 may be searched using a search user interface 250 provided by investigation server 238. Examples of such search interfaces are provided further below.

In accordance with some embodiments, buildings 202 and 204 include cameras, such as cameras 260, 262, 264 and 266, which provide video images of the areas covered by hotspots such as hotspots 214, 216, 218 and 220. In accordance with some embodiments, the video images from the cameras are stored in a video storage 270 through a network connection (not shown) and may be searched using a search user interface 272 of investigation server 238. In accordance with some embodiments, the video from the camera is stored such that it is linked to the wireless hotspot covered by the camera. Thus, video of a particular hotspot at a particular time and day may be retrieved by entering the wireless name or the MAC address of the wireless router in search user interface 272 along with the date and time.

Figure 3:
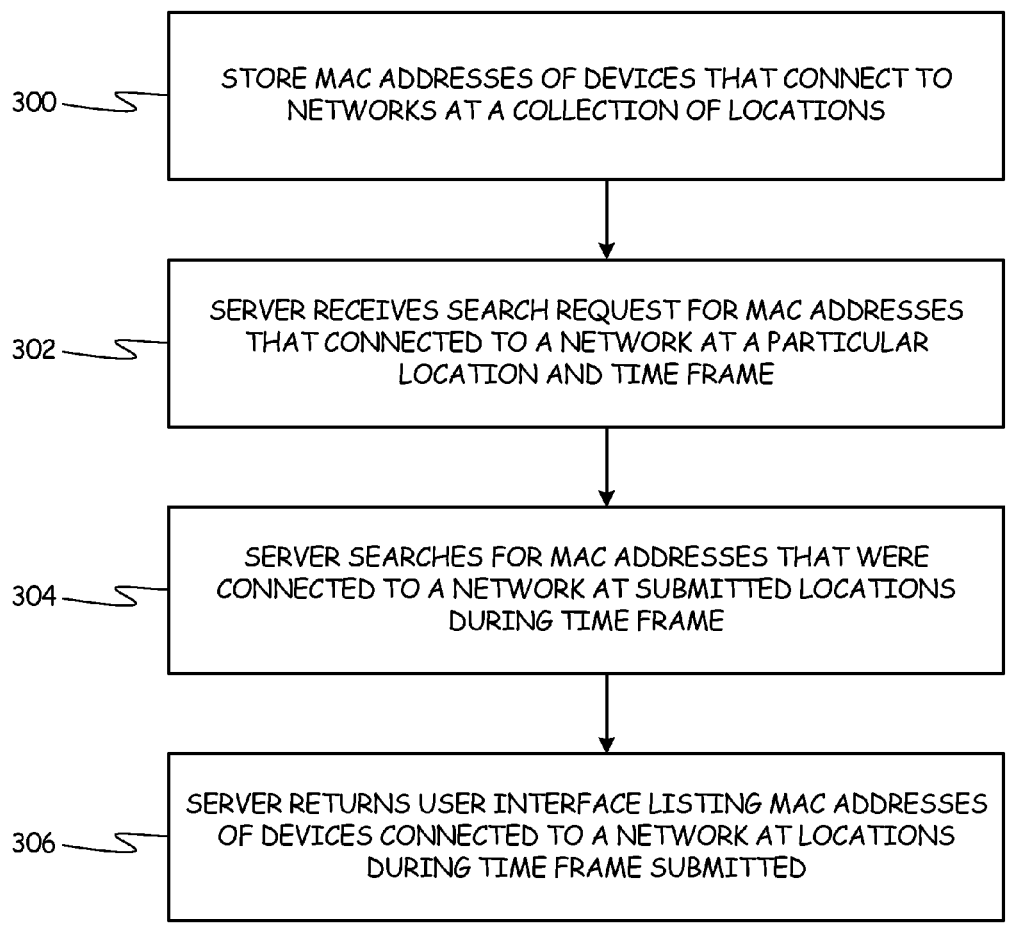
FIG. 3 provides a flow diagram of a method of searching for MAC address at a location during a time frame.

FIG. 3 provides a method of identifying MAC addresses that were connected to a network at a location during a time frame. In step 300 of FIG. 3, MAC addresses of devices that connect to networks are stored. For example, the MAC address of each mobile device that connects to a wireless router in at least one of the buildings shown in FIG. 2 is stored in MAC storage 248 along with the MAC address of the wireless router that the mobile device was connected to, the building that the wireless router is located in, the time at which the mobile device connected to the network and the time at which the mobile device disconnected from the network. Such information may be collected and stored continuously over a period of time, such as a year.

At step 302, MAC central server 240 receives a search request for MAC addresses that connected to a network at a particular location over a particular time frame. In one embodiment, the search request is submitted through a search user interface such as user interface 400 of FIG. 4.

Search user interface 400 includes a MAC address field 402 which is set to "ALL" to search for all possible MAC addresses. User interface 400 also includes check boxes 404 and 406, where check box 404 allows a user to designate all buildings serviced by MAC central server 240 and alternatively, check box 406 allows a user to select individual buildings, which can be selected using a pull down menu 408. An ADD BUILDING link 410 allows a user to designate an additional building. Whenever ADD BUILDING link 410 is selected, an additional building pull down box, such as box 408, is added to user interface 400. ADD BUILDING link 410 may be selected any number of times allowing the user to add as many individual buildings as they desire.

User interface 400 also includes start date box 412 and end date box 414 as well as start time box 416 and end time box 418. Start date box 412 and start time box 416 together define the beginning of a time frame and end date box 414 and end time box 418 define an end of the time frame.

Router selection check box 424 allows a user to select all routers in the selected buildings while router selection check box 426 allows a user to select individual routers within the buildings. If router selection check box 426 is selected, a router name pull down box 420 is used by the user to select a wireless router within the building. The router name may be a human readable name such as "electronics" or may be a MAC address. An ADD ROUTER link 422 allows a user to add additional individual routers. When ADD ROUTER link 422 is selected, an additional pull down box 420 is added to user interface 400 and the user may enter a new router name in the pull down box.

Once the user has entered the desired search parameters in the input fields of MAC address search user interface 400, the user may press search button 428 to execute the search.

At step 302, MAC central server 240 receives the parameters of the search request from search user interface 400. At step 304, MAC central server 240 searches MAC address storage 248 for MAC addresses that were connected to the network at the submitted locations (buildings and routers)

during the time frame designated in the search user interface. At step 306, MAC central server 240 returns a results user interface 251 listing the MAC addresses of devices that connected to the network at the submitted locations during the submitted time frame.

Figure 5:
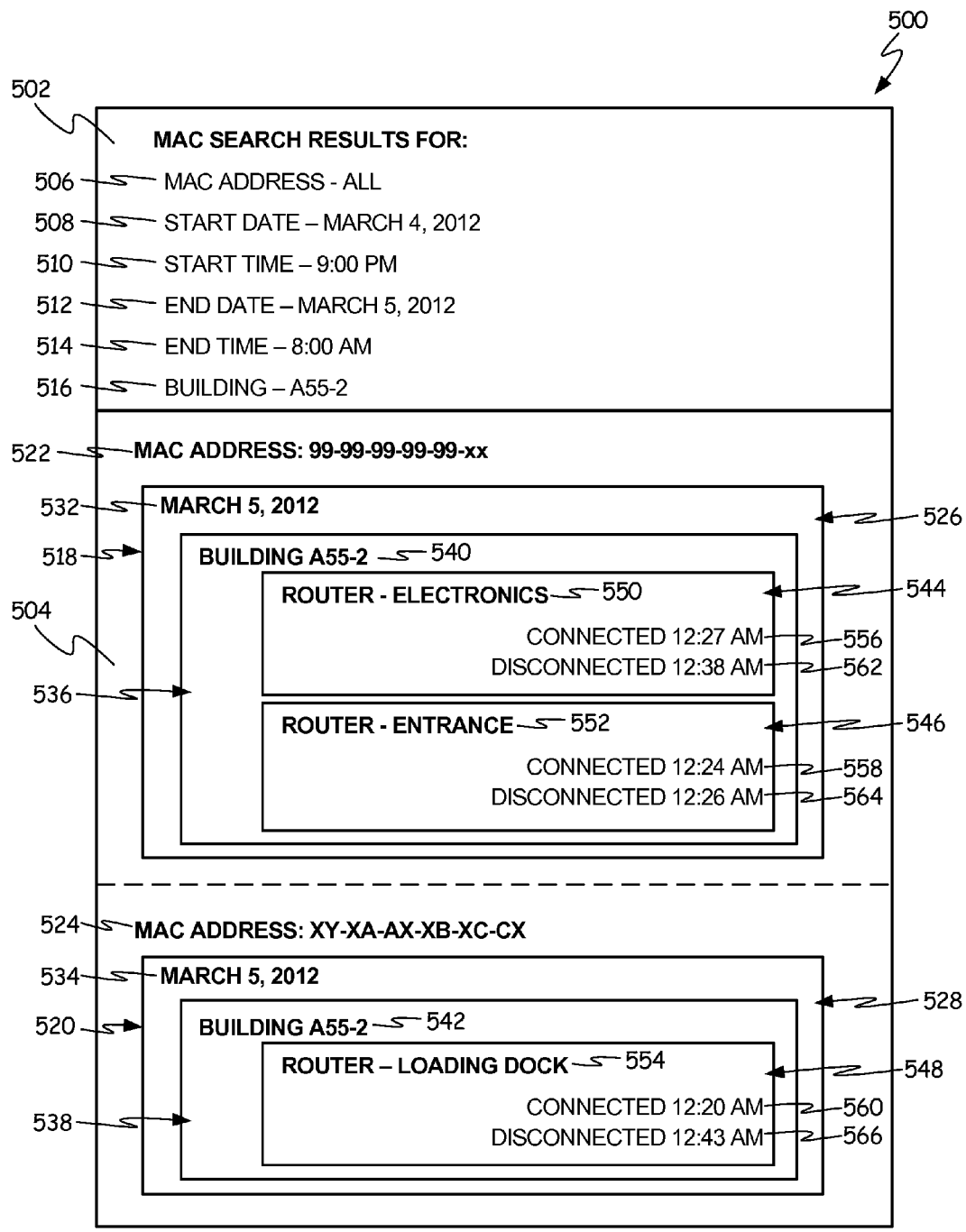
FIG. 5 provides an example of user interface providing a listing of MAC addresses connected to a network at a location during a time frame.

FIG. 5 provides an example 500 of a search results user interface 251 providing a listing of MAC addresses that connected to locations during a designated time frame. In user interface 500, a search criteria section 502 and a search results section 504 are provided. In search criteria section 502, the parameters used to perform the search are listed including MAC address parameters 506, start date parameter 208, start time parameter 510, end date parameter 512, and end time parameter 514 and location parameters 516.

The search results section 504 includes one or more MAC address sections such as MAC address section 518 and MAC address section 520. Each MAC address section is for a separate MAC address that connected to the network at a location and time that meets the search parameters. Each MAC address section includes a MAC address identifier, such as MAC address identifiers 522 and 524, which identify the MAC address of the device that connected to the network. Each MAC address section further includes one or more date sections, such as date section 526 and 528. Each date section includes a connection date, such as dates 532 and 534, and one or more location sections, such as location sections 536 and 538.

Each location section includes a location identifier, such as location identifiers 540 and 542, which identify the location where the respective device connected to the network. For example, the location identifier can be a building identifier.

Each building section includes one or more router sections, such as router sections 544, 546 and 548. Each router section has a router identifier or name, such as router identifiers 550, 552 and 554, that uniquely identifies the router that connected to the mobile device. Under some embodiments, the router name describes the location in the building serviced by the router, for example "electronics" or "loading dock." Each router section further includes a connection time such, as connection times 556, 558 and 560, as well as disconnection times 562, 564 and 566, which indicate when the device connected to and disconnected from the network.

In accordance with some embodiments, the search performed in FIG. 3 may use search user interface 250 to search for all MAC addresses that were present in a building when a crime took place. The MAC addresses returned in the search results user interface 251 then represent mobile devices that were held by possible suspects in the crime. Note that some crimes involve more than one person such as a person who enters the store and a driver or lookout. Because the area serviced by the routers extends both within a building and outside the structure of the building, it is possible for the MAC address of a mobile device held by a lookout or a driver to also be captured even though the lookout or driver does not enter the store itself.

In accordance with some embodiments, alerts may be set that are triggered when a MAC address appears in any one of a plurality of buildings. Such alerts notify security personnel that a device with a particular MAC address has attempted to make a connection to a network in a building.

Figure 6:
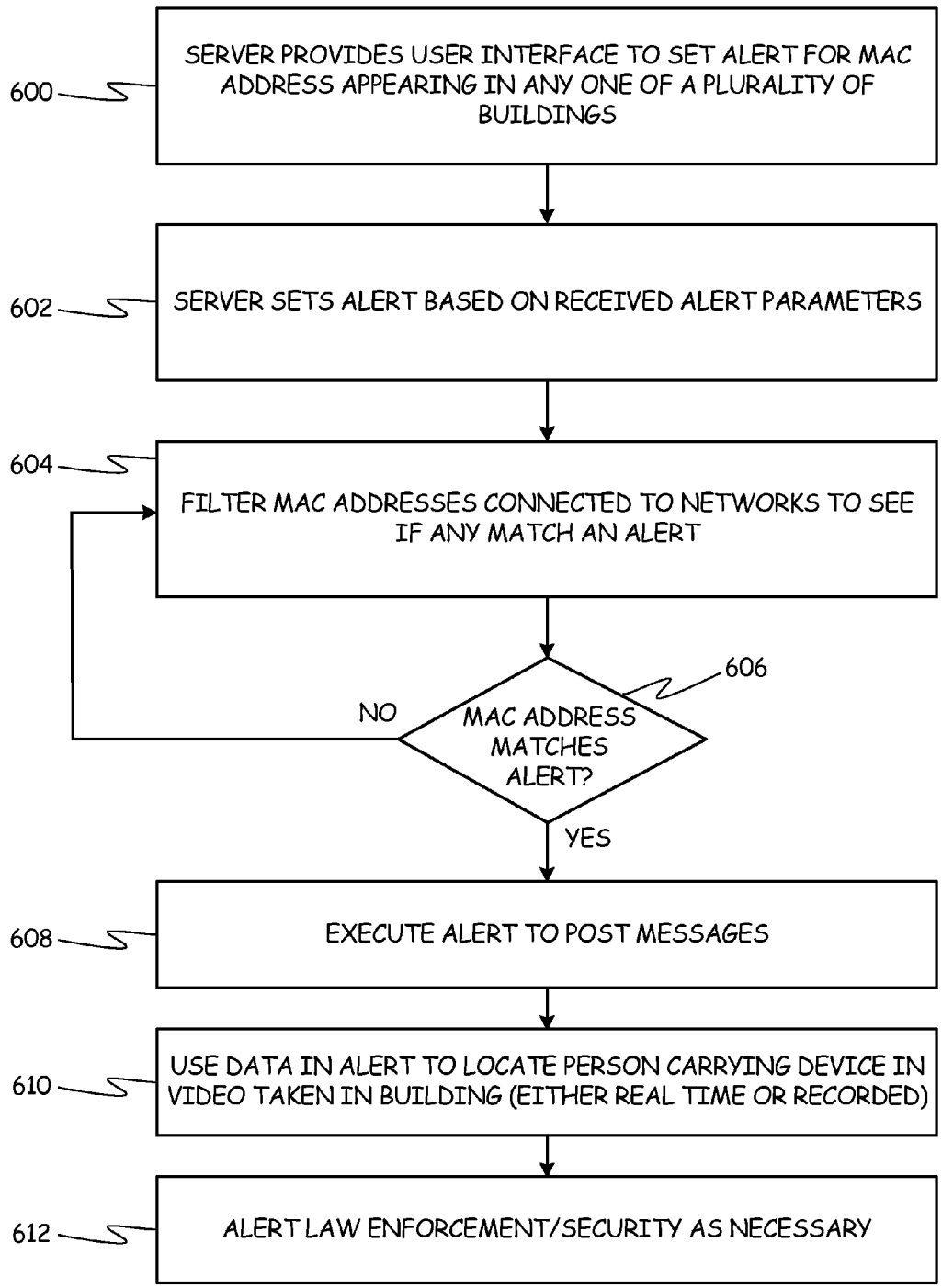
FIG. 6 provides a flow diagram for setting alerts for MAC addresses.
Figure 7:
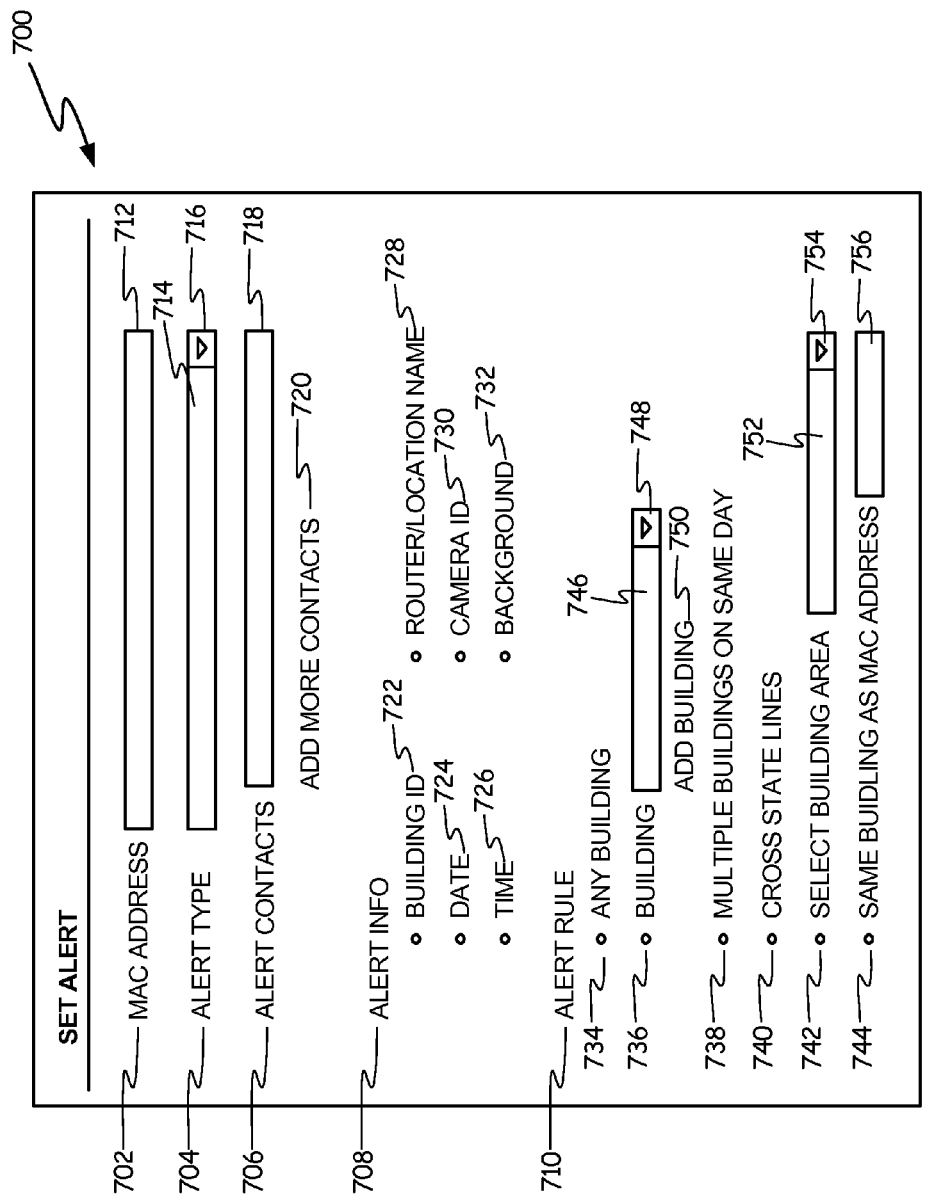
FIG. 7 provides a user interface for setting an alert.

FIG. 6 provides a flow diagram of a method of establishing alerts for MAC addresses. In step 600, a server, such as investigation server 238, provides an alert setting user interface 236 to a user that allows the user to set an alert that is to be triggered when a particular MAC address attempts to connect to a network in any one of a plurality of buildings. FIG. 7 provides an example alert setting user interface 700, which includes MAC address designation area 702, alert type designation area 704, alert contact area 706, alert info area 708 and alert rule area 710.

MAC address designation area 702 allows a user to enter a MAC address into an input box 712. This MAC address can be the MAC address of a device that is known to have been stolen or can be a MAC address of a device that is known to be held by a particular individual, such as a company-issued device, for example. Alternatively, the MAC address can be a MAC address returned from a search for MAC addresses that were present within a building at a specific time as discussed above for FIG. 3.

Alert type designation area 704 includes an input box 714 with a pull down control 716 that provides access to a list of possible alert types. Examples of alert types include e-mail alerts and SMS alerts. Other possible alert types include page posting alerts that post alerts to a webpage or a server page such as a security status page that is updated to reflect the current security status of one or more buildings in an enterprise.

Alert contacts area 706 allows a user to designate one or more contacts who are to receive an alert when the alert type is set to e-mail or SMS. In the user interface of FIG. 7, a single input box 718 is provided in alert contacts area 706. However, additional input boxes may be added to alert contacts area 706 by selecting ADD MORE CONTACTS link 720 so that a user may designate multiple contacts who are to be alerted when a MAC address connects to a network.

Alert info area 708 allows the user to designate the types of information that are to be included in the alert using one or more check boxes. The information that can be included in an alert includes a building ID 722, a date 724, a time 726, a router or location name 728, a camera ID 730, and background information 732. When building ID 722 is selected the alert will include an identifier for the building in which mobile device connected to a network. When date 724 is selected, the date when the mobile device connected to the network is provide in the alert. When time 726 is selected, the alert will include the time when the device connected to the network. When router name 728 is selected, the name of the router that the device connected to will be provided in the alert. When camera ID 730 is selected, the alert will include an identifier for a camera that captures video of the area supported by the router that connected to the mobile device. When background information 732 is selected, the alert will include background information that explains why the alert was created. For example, the background information can indicate that the MAC address was present during a crime, or that the MAC address is for a stolen device, or that the MAC address is for a device thought to be held by a person with a restraining order against them. Although FIG. 7 provides one set of possible information that may be included in an alert, those skilled in the art will recognize that additional or different information may be provided on user interface 700 for inclusion in alerts.

Alert rule area 710 allows the user to designate rules for triggering the alert using one or more radio buttons and one or more input text fields. Alert rule area 710 includes ANY BUILDING selection 734, BUILDING selection 736, MULTIPLE BUILDINGS ON SAME DAY selection 738, CROSS STATE LINES selection 740, SELECT BUILDING AREA selection 742 and SAME BUILDING AS MAC ADDRESS selection 744.

ANY BUILDING selection 734 allows the user to indicate that the alert should be triggered when the MAC address connects to any network in any building that is part of an enterprise. BUILDING selection 736 allows the user to designate particular buildings where the MAC address must be present to trigger the alert. The user may designate an individual building using input text box 746 with pull down control 748, which can be used to display a list of buildings associated with the enterprise. Additional building text boxes may be added to form 700 using ADD BUILDING link 750.

MULTIPLE BUILDINGS ON SAME DAY selection 738 allows the user to designate that the alert should be triggered if the MAC address enters multiple buildings on the same day. CROSS STATE LINES selection 740 allows the user to designate that the alert should be triggered when the MAC address is found in buildings that are in different states on the same day. SELECT BUILDING AREA selection 742 allows the user to designate that the rule should be triggered only when the MAC address enters a particular area within a building. A user may designate the area using input text box 752 and pull down control 754, which will provide a list of available areas in a building.

SAME BUILDING AS MAC ADDRESS selection 744 allows the user to enter a MAC address in an input text box 756. If the MAC address listed in input text box 712 connects to a network in a building in which the MAC address listed in text box 756 is currently connected to a network, the alert will trigger. This rule is helpful in identifying when a person may be violating a protective order that requires them to not be in the same building as someone else.

Returning to step 602 of FIG. 6, based on the information returned by alert setting user interface 236, investigation server 238 sets alerts in one or more alert filters such as alert filter 228 of local server 224 in building 202, alert filter 230 of local server 226 of building 204 and alerts filter 246 of MAC central server 240. In particular, alerts that are based on a single building are stored in the alert filters on the local server for that building. For example, if an alert had been created to detect whether a mobile device with a MAC address entered building 202, the alert will be stored in alert filter 228. For alerts that are based on a MAC address entering multiple buildings, the alerts will be set in alerts filter 246 of MAC central server 240. In other embodiments, local alert filters 228 and 230 are removed and only alert filter 246 in MAC central server 240 is provided, which examines MAC addresses that have connected to networks in multiple buildings and is able to trigger alerts that have been written for a single building or for multiple buildings.

At step 604, alert filters 228, 230 and 246 filter the MAC addresses that connect to routers covered by the alert filter. To do this, local servers 224 and 226 request that the wireless routers send the MAC address of each device that is connected to the router as well as the connection time and disconnection time for the MAC address. When a new MAC address is received from a router, the servers 224, 226 provide the new MAC address to their respective alert filter 228, 230, which then compares the MAC address to the MAC addresses stored for each of the alerts stored on the filter. MAC transfer units 242 and 244 in local servers 224 and 226, respectively, also forward the MAC addresses of connecting devices to alerts filter 246 in MAC central server 240. This allows alert filter 246 to compare the MAC addresses to alerts stored in alert filter 246 to see if any of the MAC addresses trigger an alert set for alerts filter 246.

Under most embodiments, the alerts filters operate in real-time, which means that the MAC addresses are being provided to the alerts filter by local servers 224 and 226 as quickly as possible and are not being stored for later batch processing.

At step 606, each alert filter determines if a MAC address it received matches a MAC address stored for an alert. If the MAC address does not match an alert, the process returns to step 604 to continue filtering the MAC addresses of devices that are connecting to the networks. If a MAC address matches an alert at step 606, the alert filter executes the alert at step 608 to post or send information about the mobile device that connected or attempted to connect to the network.

As noted above, some alert rules require that another MAC address be present in a same building as a received MAC address in order to be triggered. Such rules are set by selecting radio button 744 of FIG. 7 and designating the other MAC address in text box 756. When the alert filter determines that the received MAC address has such a rule associated with it, the alert filter requests the MAC address for every device currently connected to a router in the building. If the other MAC address is currently connected to a network in the same building, the alert will trigger. If the other MAC address is not currently connected to the network in the same building, the alert will not trigger.

For alerts that send messages using e-mails, the alert filter contacts an e-mail server, such as e-mail server 232, and instructs the e-mail server to send an e-mail. For alerts that use SMS, the alerts filter instructs SMS server 234 to send a message. For alerts that change a server page, the alert filters can send a message to a server controlling the server page (not shown) instructing the server to alter one or more server pages based on the alert.

Issuing an alert includes providing information in the alert that was selected to be part of the alert through alert setting user interface 236. This can include providing location information for the network router, where such location information corresponds to an area covered by a video camera. It can also include providing background information that explains what led to the creation of the alert such as an indication that the device was present in a building when a crime was committed in the building, an indication that the device has been reported stolen, or an indication that the person carrying the device is not permitted to be in the same building as another person who is currently in the building where the device has been detected.

At step 610, a person receiving the alert uses information in the alert to locate an image of a person carrying the device. This can be done by using the location information in the alert to locate video of the area where the device connected to the network. For example, if the alert indicates that a mobile device connected to a router in an electronics department, the person receiving the alert can search for current or past video of the electronics department. In FIG. 2, video from cameras 260, 262, 264 and 266 is stored in video storage 270 and can be searched using a search user interface 272. In other embodiments, the video from the cameras is stored locally on the cameras or on a server within each building. In such embodiments, search user interface 270 performs a separate search of each memory location where video is stored. Searching for images of a person carrying a mobile device that connected to a network can be done to collect images of possible suspects in crimes or to confirm the identity of a person carrying the device, for example. Those skilled in the art will recognize that step 610 is optional. Users receiving the alert may also alert law enforcement or other security as necessary at step 612.

In further embodiments, methods are provided for searching for buildings and times when a device with a particular MAC address connected to a network so that video surveillance of the building can be reviewed to identify the person carrying the device.

Figure 4:
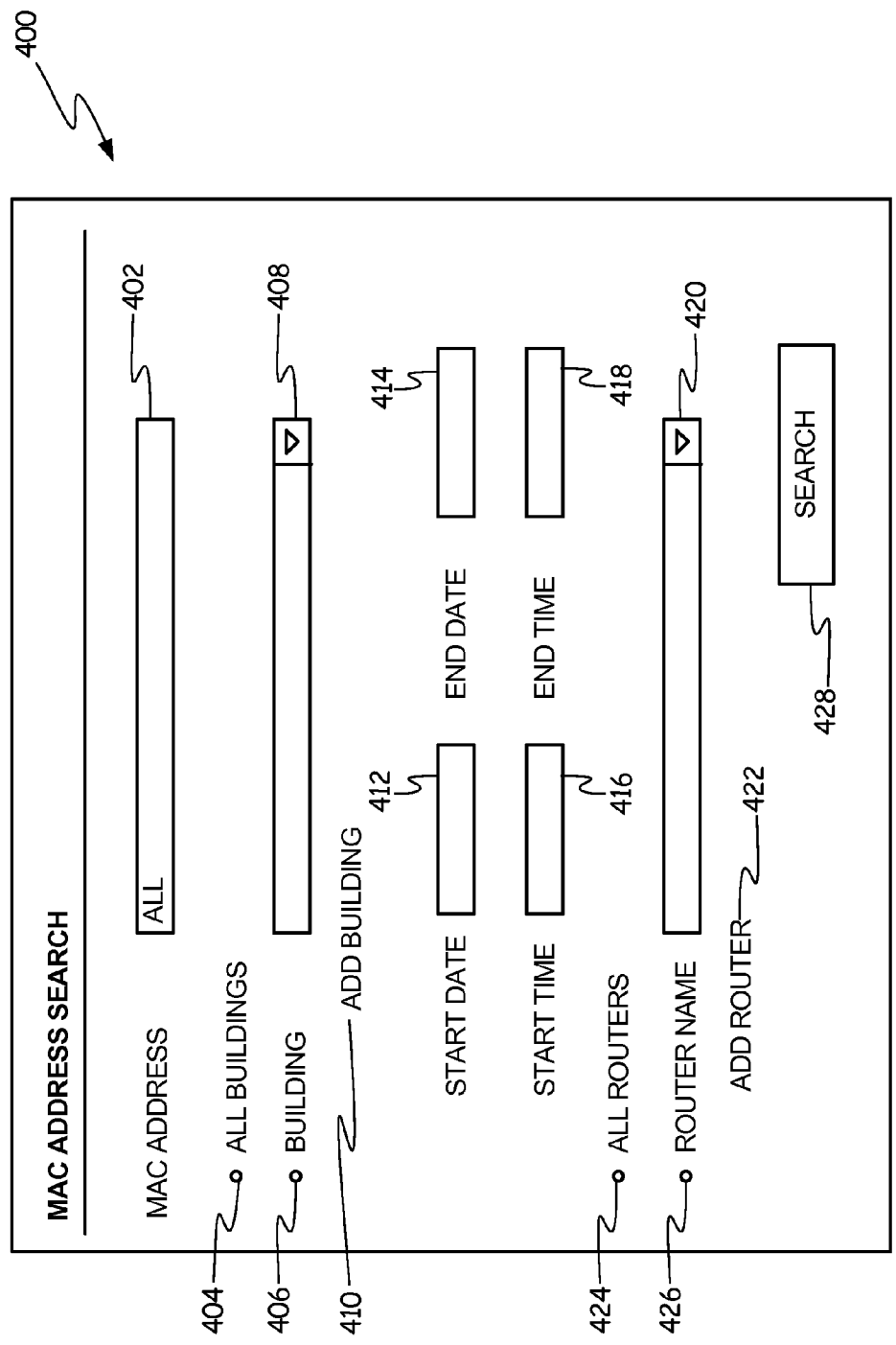
FIG. 4 provides an example of a search request user interface.
Figure 8:
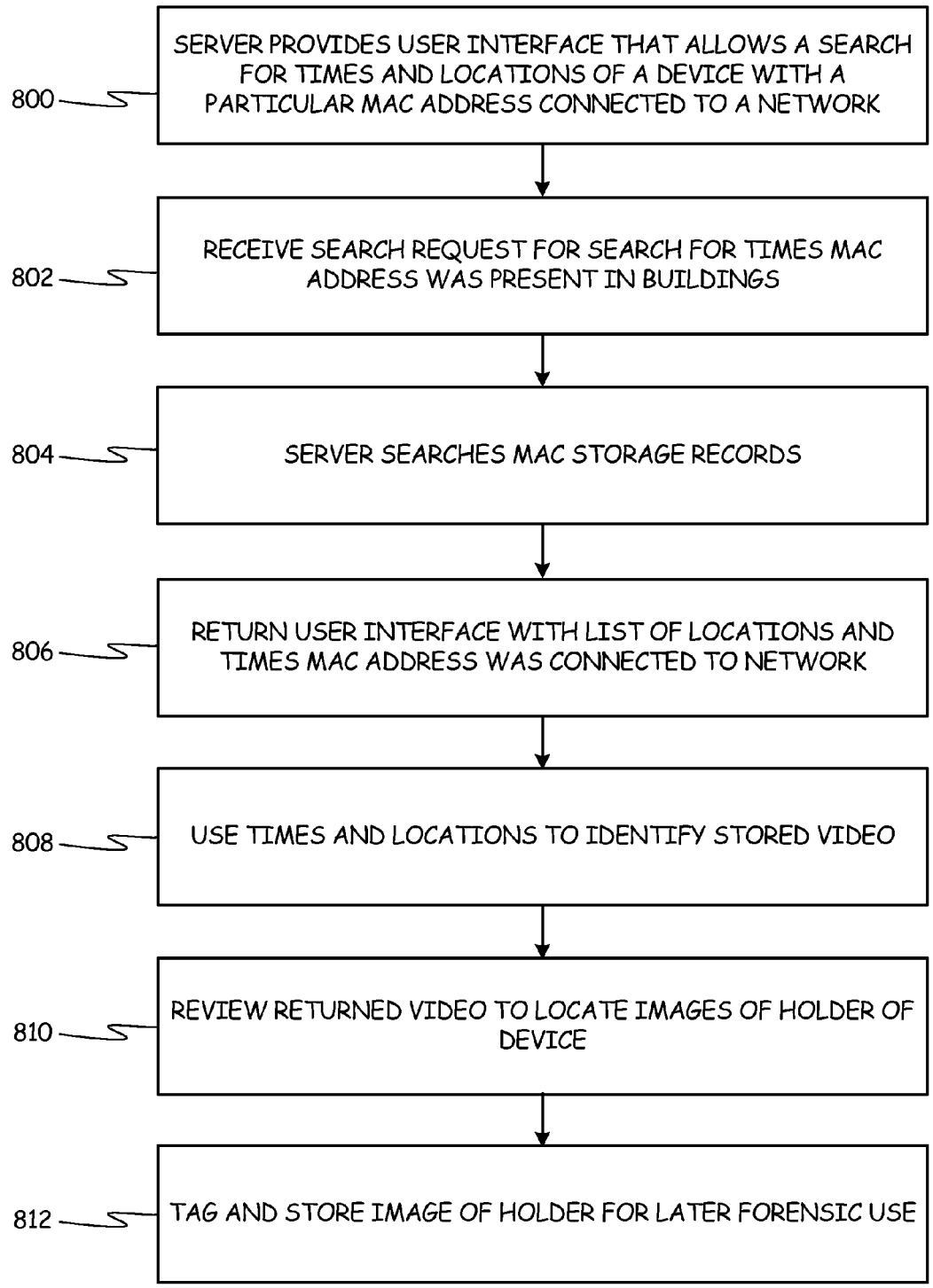
FIG. 8 provides a flow diagram for searching for locations and times when a MAC address was connected to a network.

FIG. 8 provides a diagram of one such method. In step 800, a server, such as investigation server 238, provides a search user interface, such as search user interface 250 that allows a user to search for times and locations that a mobile device with a particular MAC address connected to a network. Search user interface 400 of FIG. 4 is an example of such a search interface. At step 802, a server such as MAC central server 240 receives the request to search for times that a MAC address was present in buildings in an enterprise. At step 804, MAC central server 240 performs a search of MAC address storage 248, which stores MAC addresses and the times and locations that they connected to a network. At step 806, MAC central server 240 returns a results user interface 251 with a list of locations and times that the MAC address was connected to a network.

Figure 9:
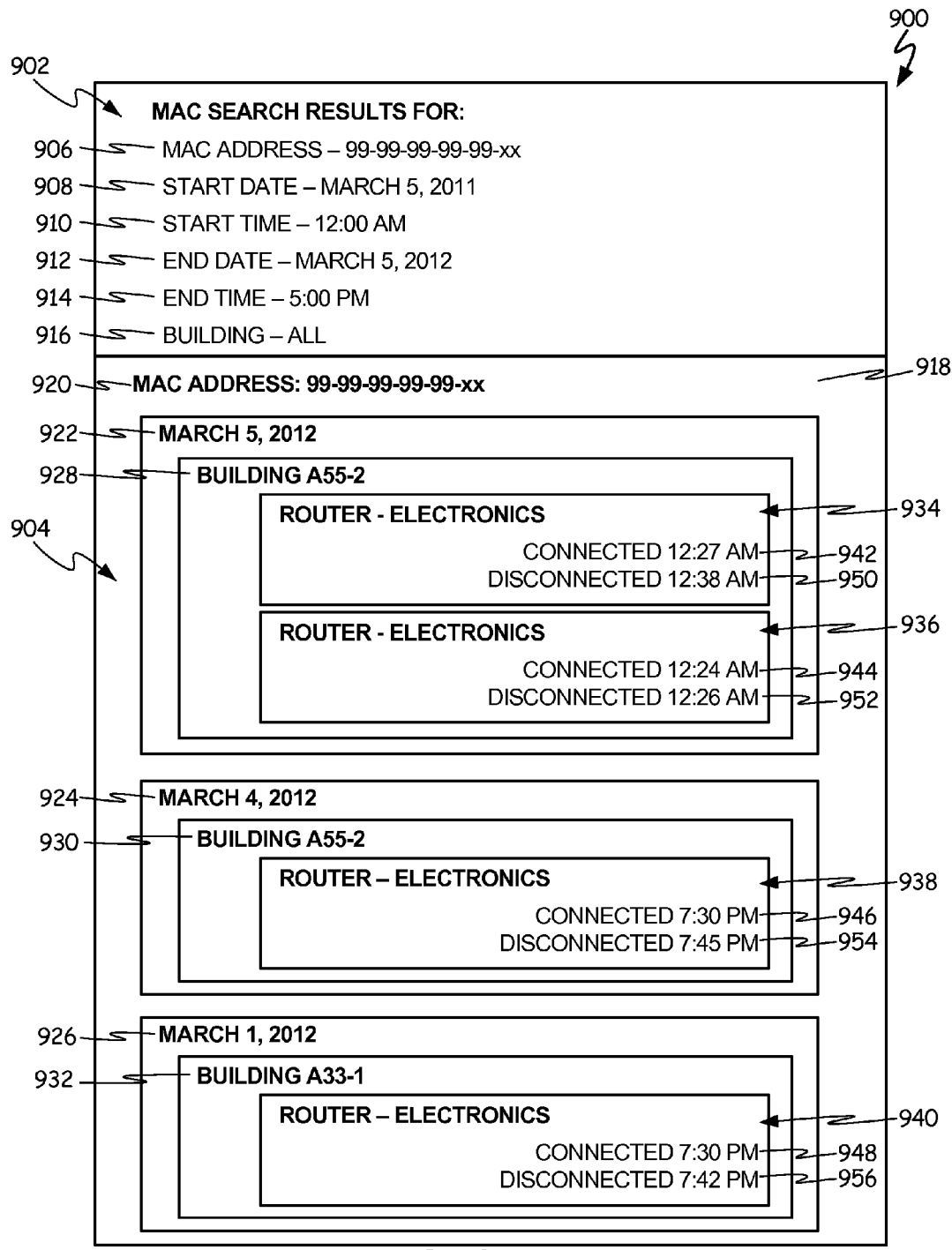
FIG. 9 provides a user interface showing search results for locations and times when a MAC address was connected to networks.

FIG. 9 provides an example of a results user interface 900. Results user interface 900 includes search parameter section 902 and search results section 904. Search parameter section 902 includes a MAC address identification section 906, a search start date 908, a search start time 910, a search end date 912, a search end time 914 and a building list 916. MAC address identification section 906 identifies the MAC address that was being searched. Search start date 908 and search start time 910 define the beginning of a time frame and search end date 912 and search end time 914 define the end of the time frame. The time frame represents a period of time when the MAC address must have connected to a network in order to match the search parameters.

Results section 904 includes one or more MAC address sections such as MAC address section 918, which includes a MAC address identifier 920. Each MAC address section includes one or more date sections such as date sections 922, 924 and 926. Each date section represents a date that the MAC address was connected to at least one network. Each date section includes one or more building sections such as building sections 928, 930 and 932. Each building section represents a building housing a router that the MAC address connected to during its respective date. Each building section includes one or more router sections such as router sections 934, 936, 938, and 940. Each router section represents a particular wireless router that was connected to the MAC address device. Each router section includes a connection time and disconnection time representing the time frame when the MAC address was connected to the router such as connection times 942, 944, 946 and 948 and disconnection times 950, 952, 954 and 956. Thus, results section 904 provides a list of multiple locations in a building or store where the device connected to wireless routers. Looking at this list and the times of connections, it is possible to derive a path that the person carrying the device followed as they moved through the building. This information can be helpful in determining if the person carrying the device is likely "casing" the building for a future crime. Results section 904 also provides a list of locations that can include locations in different states.

At step 808, the times and locations where the MAC address connected to a network are used to identify stored videos. In some embodiments, this is done automatically using a computer program that parses the search results associated with search results user interface 900 to retrieve the locations, dates and times that the MAC address was connected to a network and uses those values to search video storage 270 to locate videos of those locations at those dates and times.

At step 810, the returned videos are reviewed to locate images of the holder of the device corresponding to the MAC address. At step 812, video that shows the holder of the MAC address device is tagged and stored for later forensic use such as during a criminal trial.

Figure 10:
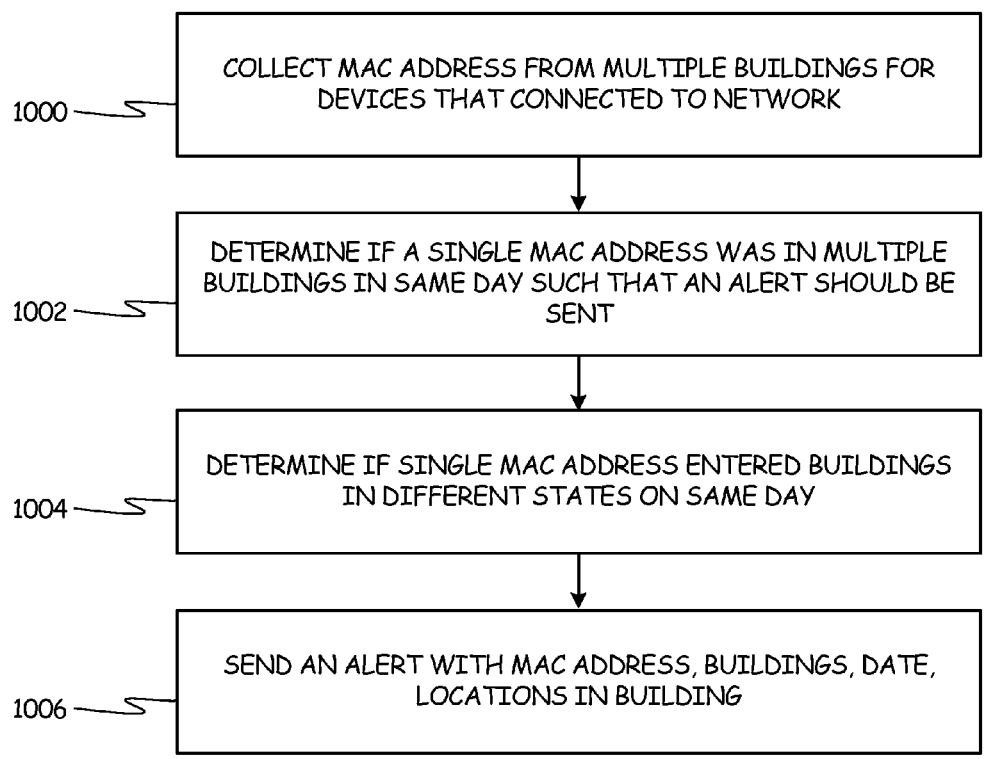
FIG. 10 provides a flow diagram for collecting MAC addresses and sending certain alerts.

FIG. 10 provides a method performed by alert filter 246 as a batch process. In FIG. 10, MAC addresses for devices that connected to a network are collected from multiple buildings at step 1000. At step 1002, alerts filter 246 determines if a single MAC address was in multiple buildings in a same day such that an alert should be sent. In accordance with one embodiment, an alert is sent if a same mobile device appears in three retail stores in a same day. At step 1004, alerts filter 246 determines if a single MAC address entered buildings in different states on the same day. If either of steps 1002 or 1004 indicates that an alert should be sent, an alert is sent with the information designated for the alert such as the MAC address, location in the building, building identifier, state and times of connection.

Figure 11:
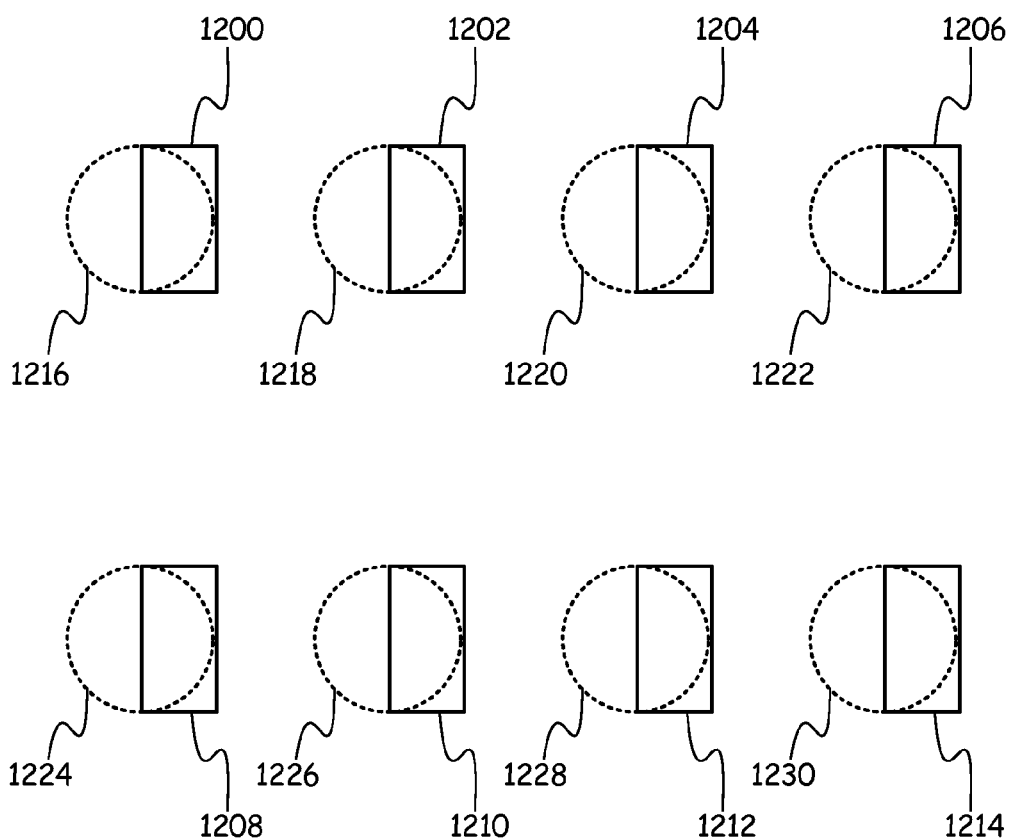
FIG. 11 provides a schematic diagram showing wireless hotspots and checkout lanes.

In further embodiments, MAC address detection is used to determine collusion between customers and employees at checkout counters in a retail environment. FIG. 11 provides a top plan view showing checkout counters such as checkout counters 1200, 1202, 1204, 1206, 1208, 1210, 1212 and 1214. Each checkout counter has an associated wireless router support area that supports only a single checkout counter such as router support areas 1216, 1218, 1220, 1222, 1224, 1226, 1228 and 1230. As such, each wireless router has a corresponding checkout such that when a device connects to a wireless router, there is high confidence that the holder of the device is standing in front of the associated checkout counter. Although the area supported by the wireless routers are shown as being separate and not overlapping, in other embodiments, the support areas will overlap. However, because the signal from the wireless router is stronger near the checkout counter it supports, the wireless device will connect to the router associated with the checkout counter instead of with a wireless router at a neighboring checkout counter.

Figure 12:
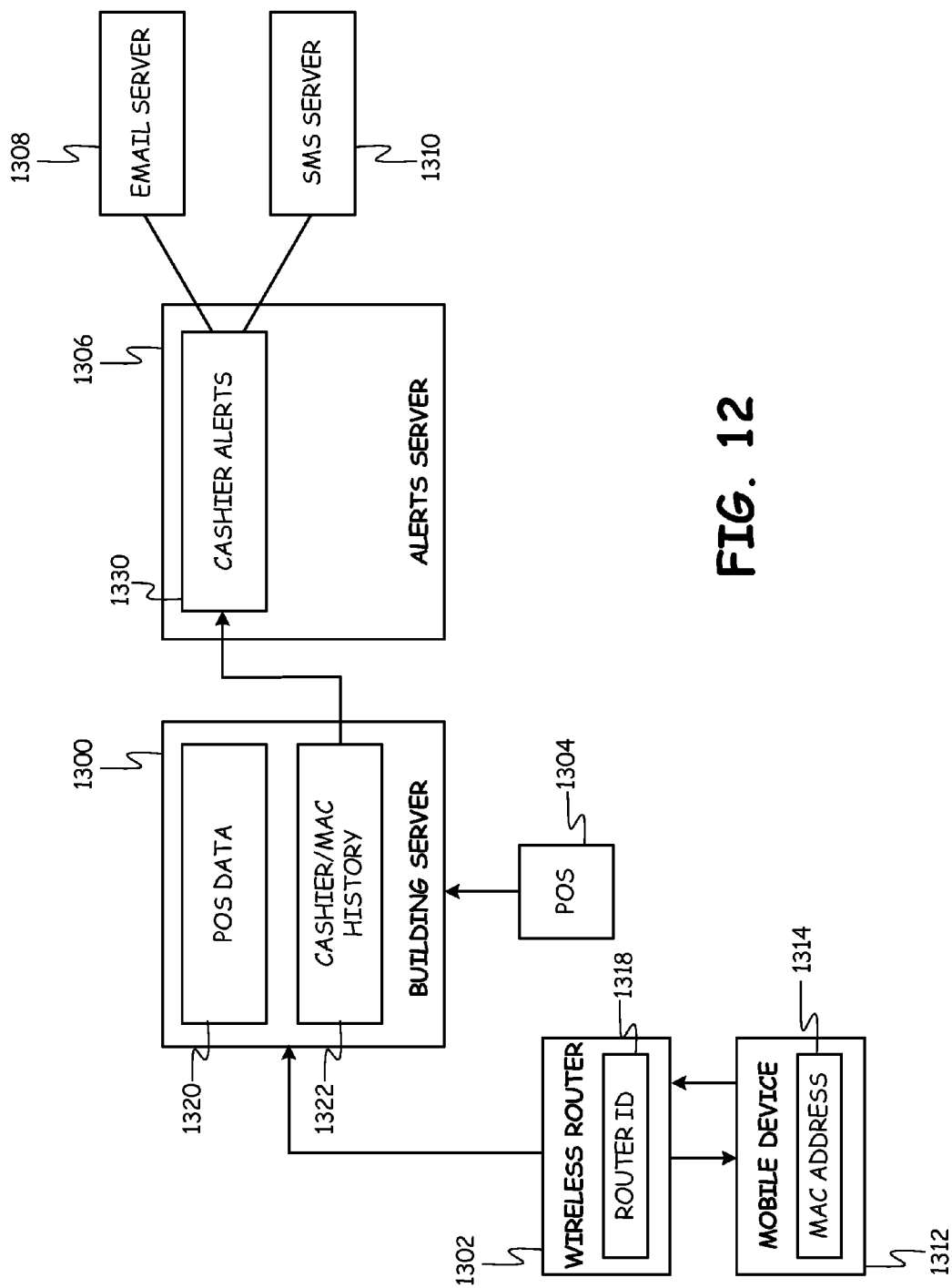
FIG. 12 provides a block diagram of elements used in a cashier alert system.
Figure 13:
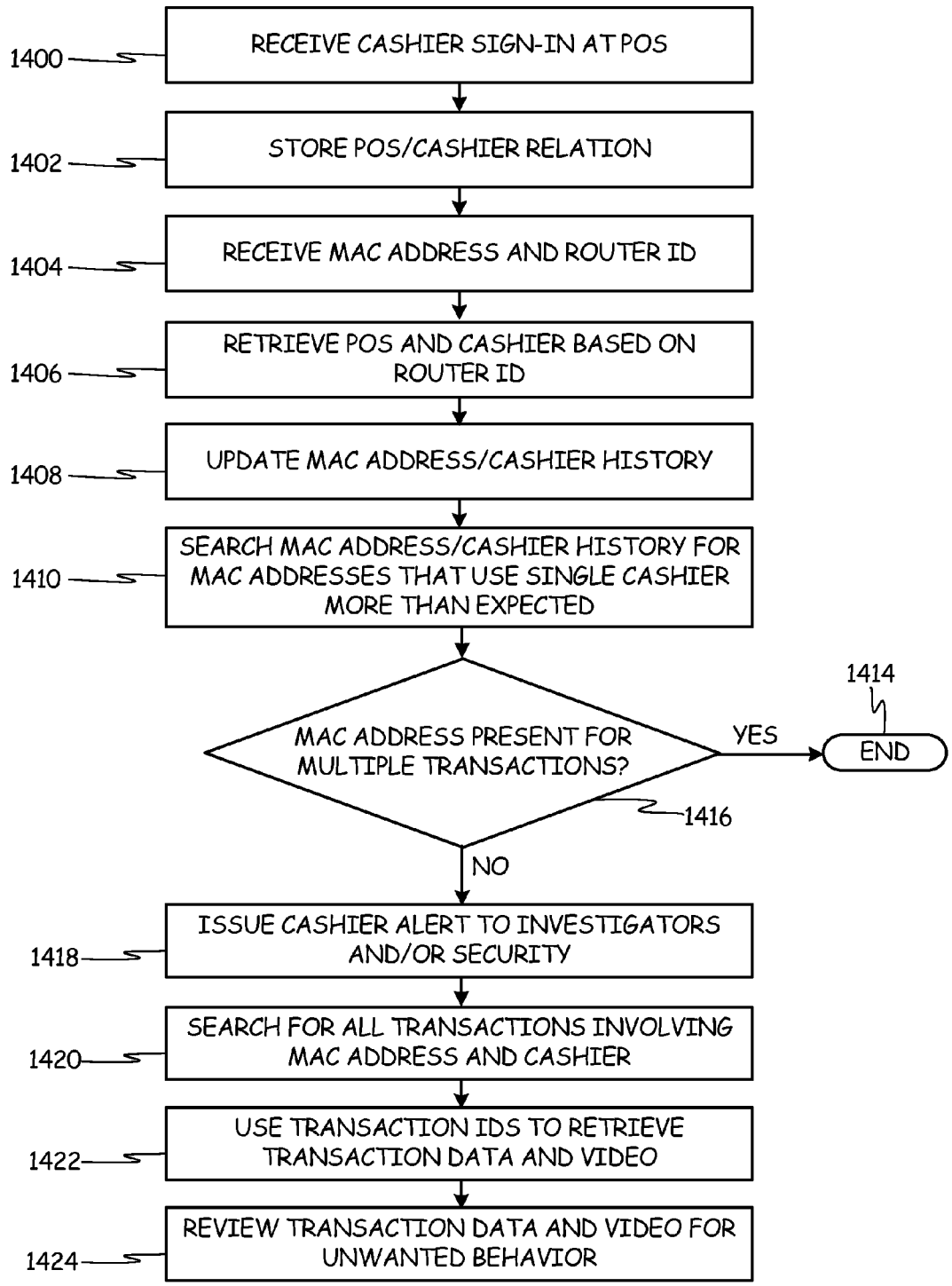
FIG. 13 provides a flow diagram of a method of forming cashier alerts.

FIG. 12 provides a block diagram and FIG. 13 provides a flow diagram of elements used in detecting customer-employee collusion in retail settings. In FIG. 12, a building server 1300 is shown connected to a wireless router 1302 and a point-of-sale register 1304. Point-of-sale register 1304 and wireless router 1302 may be on independent networks or may be on a single common network with building server 1300. Further, although building server 1300 is shown as a single server it may be implemented as multiple servers that are in communication with each other. Building server 1300 is in communication with an alerts server 1306, which in turn can communicate with an e-mail server 1308 and a short message service (SMS) server 1310.

Wireless router 1302 is able to establish a wireless connection with a mobile device 1312 when the device is positioned within the area covered or supported by the wireless router. This area corresponds to an area around point of sale register 1304 such that when a device connects to wireless router 1302 there is high confidence that the mobile device is being carried by a person near point of sale register 1304. Mobile device 1312 includes an internal MAC address 1314 that mobile device 1312 provides to wireless router 1302.

Referring to FIG. 13, at step 1400, building server 1300 receives information from POS 1304 indicating that a cashier has signed into POS 1304 to begin handling transactions. At step 1402, building server 1300 stores an identifier for POS 1304 along with an identifier for the cashier in POS data 1320. At step 1404, building server 1300 receives a MAC address of a device connected to wireless router 1302 as well as the router ID 1318 of wireless router 1302. This information may be sent by wireless router 1302 on its own initiative or may be requested by building server 1300 periodically.

At step 1406, the router ID of wireless router 1302 is used to identify the POS terminal 1304 using POS data 1320, which associates each wireless router with a point-of-sale register and which identifies the cashier currently signed into the point-of-sale register. At step 1408, building server 1300 updates a MAC address/cashier history 1322 which stores a log of times and dates when a MAC address for a device appeared at a POS terminal being operated by the cashier. In accordance with some embodiments, cashier/MAC address history 1322 takes the form of a database which has an entry for each transaction that took place while the MAC address was at the cashier's point-of-sale terminal. Each entry contains the MAC address, the cashier's ID, the dates and times when the MAC address was at the cashier's point-of-sale terminal and a transaction identifier that can be used to identify the merchandise and payments involved in the transaction.

Steps 1400-1408 are repeated for each POS terminal on a continuous basis over a period of time. After sufficient data has been collected, alerts server 1306 searches the MAC address/cashier history at step 1410 to look for MAC addresses that appear with a single cashier more often than expected. In accordance with one embodiment, a separate search is performed for each MAC address with each search locating the identities of the cashiers the MAC address appeared before and the percentage of the transactions that were handled by each cashier for this MAC address. If a percentage of transaction handled by a cashier for a MAC address exceeds some threshold, such as 15%, the MAC address and cashier are returned by the search as being possible collusion suspects. Note that cashiers will use different point of sale registers for different transactions. As such, alerts server 1306 treats entries for different point of sale registers for a same cashier and a same device identifier as all being transactions involving the cashier and the person holding the device.

In accordance with some embodiments, after it has been determined that a MAC address is associated with possible customer-employee collusion, an alert can be set that will be triggered the next time the device connects to a router at the cashier's point-of-sale register. Such an alert can be set using the user interface of FIG. 7 and designating the select building area as point-of-sale registers. When the alert is triggered, it can be sent in real time to store security with an indication that the person holding the device is at a point of sale register operated by a cashier and that the cashier handles a disproportionate number of transactions for the person holding the device.

At step 1416, the MAC addresses and cashiers that are returned as collusion suspects in step 1414 are filtered to remove MAC addresses of devices held by employees. One technique for doing this is to determine if the MAC address was present at this cashier over three consecutive transactions in a day. Since customers are typically not involved in three consecutive transactions, a MAC address that was present at the POS for three consecutive transactions is most likely associated with a device carried by an employee. If the MAC address was present at the cashier for three consecutive transactions, the process ends at step 1414.

If the MAC address was not present at the cashier for three consecutive transactions, the process continues at step 1418 where a cashier alert 1330 is issued by alerts server 1306. The cashier alerts 1330 can include sending e-mails through e-mail server 1308 and/or sending a message through SMS server 1310. In accordance with further embodiments, the cashier alerts 1330 can be a spreadsheet indicating all cashiers and MAC addresses that are suspected of being in collusion as well as the retail stores where the cashiers work.

At step 1420, cashier/MAC address history 1322 is searched to locate all transactions involving the MAC address and the cashier. The retrieved transactions are used at step 1422 to retrieve merchandise and payment data for the transactions as well as video of the transactions. At step 1424, the transaction data and the video are examined to determine if there is any wrongful collusion between a customer and the cashier.

Figure 14:
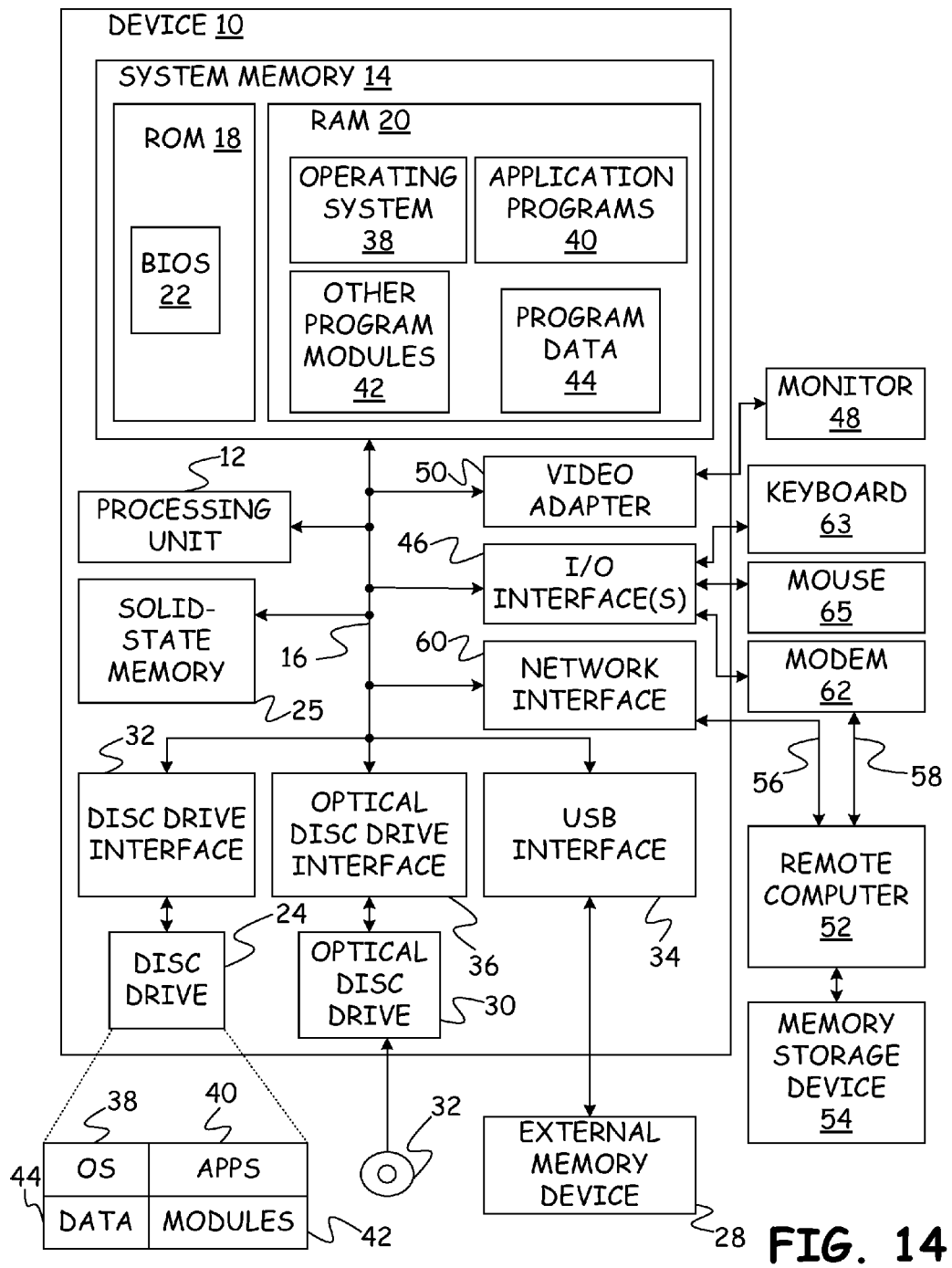
FIG. 14 is a block diagram of a computing device that may be used in accordance with the various embodiments.

An example of a computing device that can be used as a server and/or client device in the various embodiments is shown in the block diagram of FIG. 14. The computing device 10 of FIG. 14 includes a processing unit 12, a system memory 14 and a system bus 16 that couples the system memory 14 to the processing unit 12. System memory 14 includes read only memory (ROM) 18 and random access memory (RAM) 20. A basic input/output system 22 (BIOS), containing the basic routines that help to transfer information between elements within the computing device 10, is stored in ROM 18.

Embodiments of the present invention can be applied in the context of computer systems other than computing device 10. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computing device 10 further includes a hard disc drive 24, a solid state memory 25, an external memory device 28, and an optical disc drive 30. External memory device 28 can include an external disc drive or solid state memory that may be attached to computing device 10 through an interface such as Universal Serial Bus interface 34, which is connected to system bus 16. Optical disc drive 30 can illustratively be utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives, solid state memory and external memory devices and their associated computer-readable media provide nonvolatile storage media for computing device 10 on which computer-executable instructions and computer-readable data structures may be stored. Other types of media that are readable by a computer may also be used in the exemplary operation environment.

A number of program modules may be stored in the drives, solid state memory 25 and RAM 20, including an operating system 38, one or more application programs 40, other program modules 42 and program data 44. For example, application programs 40 can include instructions for performing the steps described above for storing, tracking and searching for MAC addresses that connect to a network and for storing and searching for video.

Input devices including a keyboard 63 and a mouse 65 are connected to system bus 16 through an Input/Output interface 46 that is coupled to system bus 16. Monitor 48 is connected to the system bus 16 through a video adapter 50 and provides graphical images to users. Other peripheral output devices (e.g., speakers or printers) could also be included but have not been illustrated. In accordance with some embodiments, monitor 48 comprises a touch screen that both displays input and provides locations on the screen where the user is contacting the screen.

Computing device 10 may operate in a network environment utilizing connections to one or more remote computers, such as a remote computer 52. The remote computer 52 may be a server, a router, a peer device, or other common network node. Remote computer 52 may include many or all of the features and elements described in relation to personal computer 10, although only a memory storage device 54 has been illustrated in FIG. 14. The network connections depicted in FIG. 14 include a local area network (LAN) 56 and a wide area network (WAN) 58. Such network environments are commonplace in the art.

Computing device 10 is connected to the LAN 56 through a network interface 60. Computing device 10 is also connected to WAN 58 and includes a modem 62 for establishing communications over the WAN 58. The modem 62, which may be internal or external, is connected to the system bus 16 via the I/O interface 46.

In a networked environment, program modules depicted relative to computing device 10, or portions thereof, may be stored in the remote memory storage device 54. For example, application programs may be stored utilizing memory storage device 54. In addition, data associated with an application program may illustratively be stored within memory storage device 54. It will be appreciated that the network connections shown in FIG. 14 are exemplary and other means for establishing a communications link between the computers, such as a wireless interface communications link, may be used.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   receiving an identifier for a mobile device at an investigations server;
   receiving background information to include in an alert message at the investigations server, the background information explaining why an alert rule is generated;
   generating by a processor in the investigations server an alert rule and transmitting the alert rule to more than one but not all of a plurality of alert filters, each alert filter associated with a respective building, such that when the mobile device with the identifier attempts to connect to a network in any of a plurality of buildings, the alert message is issued and contains the background information
   wherein generating the alert rule comprises generating the alert rule so that the alert rule requires an additional mobile device listed in the alert rule to be within a same building as the mobile device that attempted to connect to the network in order for the alert rule to be triggered and that causes the alert filter to request identifiers for all mobile devices currently connected to routers in a building associated with the alert filter before issuing the alert message.

2. The method of claim 1 wherein the background information in the alert message comprises an indication that the mobile device was previously connected to a network in a building when a crime was committed in the building.

3. The method of claim 1 wherein the alert message further comprises an identification of the building where the mobile device attempted to connect to the network.

4. The method of claim 1 wherein the alert message further comprises location information for a network router that the mobile device attempted to connect to, wherein the location information corresponds to an area covered by a video camera.

5. The method of claim 1 wherein the background information comprises information indicating that the mobile device has been reported stolen.

6. The method of claim 1 wherein the background information in the alert message comprises information indicating that a person who is not permitted to be within a same building as another person is in the same building with that other person.

* * * * *